2,839,902

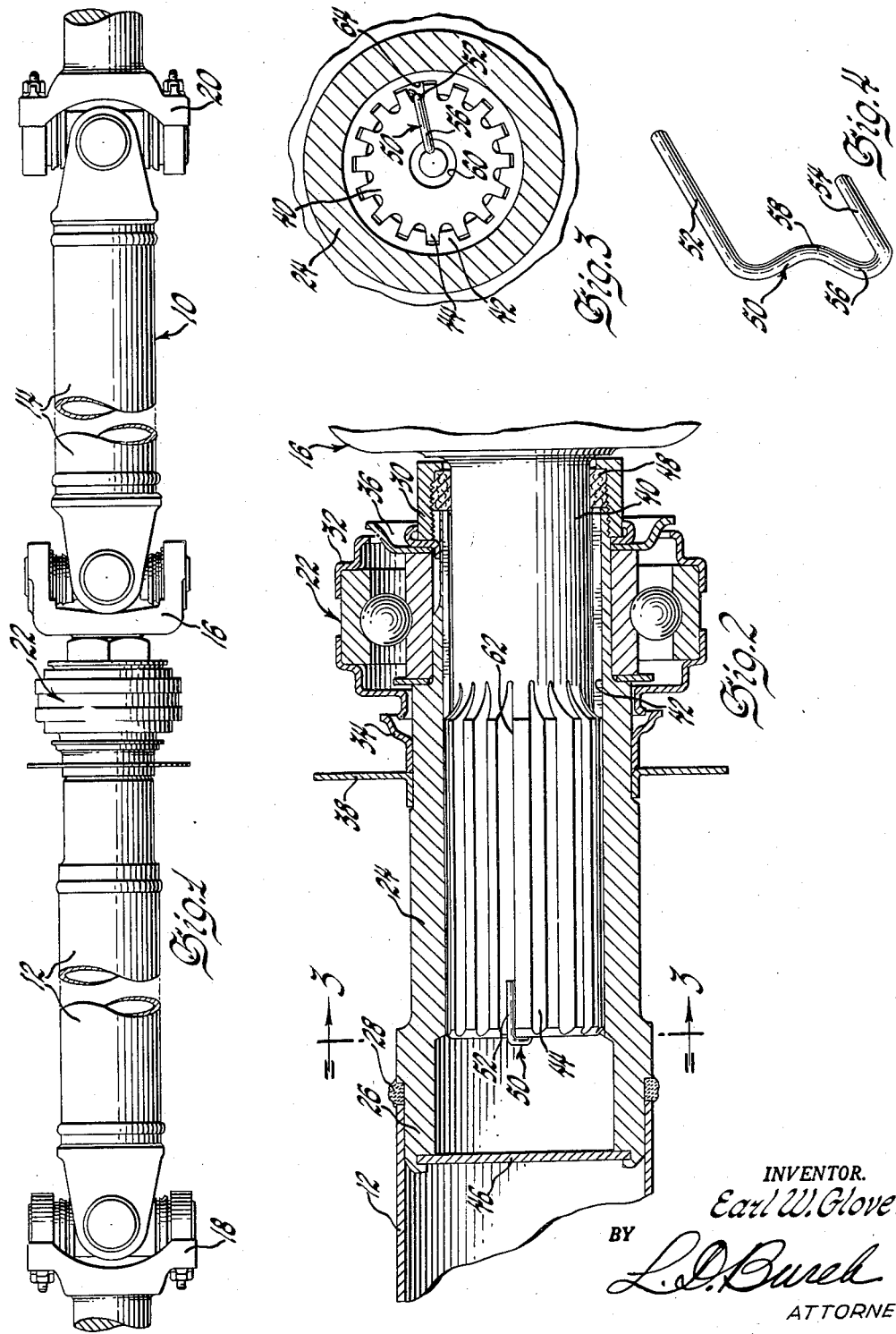
June 24, 1958 — E. W. GLOVER — 2,839,902
INDEXING MEANS FOR SPLINED CONNECTED MEMBERS AND THE LIKE
Filed Oct. 18, 1956
INVENTOR.
Earl W. Glover
BY
ATTORNEY

United States Patent Office 2,839,902
Patented June 24, 1958

INDEXING MEANS FOR SPLINED CONNECTED MEMBERS AND THE LIKE

Earl W. Glover, Saginaw, Mich., assignor to General Motors Corporation, Detroit, Mich., a corporation of Delaware Application October 18, 1956, Serial No. 616,769

4 Claims. (Cl. 64—6)

This invention relates to indexing means in general and more particularly to indexing means for use with spline connected members.

The assembly of multiple sectioned vehicle drive shafts including two or more universal joint connections requires some means of obtaining the proper relative angular relationship between different of the joint connections. Where splined shaft connections are used a commonly known indexing means has been to have an oversized spline formed in one member and an oversized and complementary splineway formed in the other member so that the shaft members are engaged together only with the oversized spline and splineway aligned.

It is here proposed to provide a much more simple and less expensive indexing means for splined joint connections.

The proposed indexing means permits the splined members to have their external or internal splines, as the case may be, formed without interruption. Subsequently, one of the splines is removed from one of the members and a spring wire clip is disposed upon the end of the other splined member, preferably the male member, with a leg portion thereof lying within the splineway which would have received the spline of the first-mentioned member which was removed.

The spring wire clips are inexpensive as regards material and manufacture and are much more readily adapted for use than having either an oversized spline formed or having the spline forming operation interrupted so as not to form one of the splineways and thereby provide a keying block.

In the drawings:

Figure 1 is a side view of a multiple sectioned vehicle drive shaft including several universal joint connections.

Figure 2 is an enlarged cross-sectioned view of a part of the drive shaft of Figure 1 showing the present invention as used therewith.

Figure 3 is a cross-sectioned end view of the splined shaft connection of Figure 2 taken in the plane of line 3—3 and looking in the direction of the arrows thereon.

Figure 4 is a perspective view of the spring clip forming part of the proposed indexing means.

The vehicle drive shaft 10 shown in the drawings includes forwardly and rearwardly disposed drive sections 12 and 14, respectively. A universal joint 16 connects the two parts of the drive shaft together and universal joints 18 and 20 are secured to the outer ends of the respective shaft sections for connecting the shaft to drive and driven means; such as the vehicle engine or transmission output shaft, not shown, and to the differential drive input pinion, which is also not shown.

The after end of the forward drive shaft section 12 has a bearing member 22 provided thereon by means of which the central part of the drive shaft may be supported, as to the vehicle frame, to prevent the shaft from flopping about in use.

A sleeve member 24 has one end, as at 26, telescoped within the end of the tubular drive section 12 and welded thereto as at 28. The inner race of the bearing 22 is received within an externally stepped portion of the sleeve and a lock nut fastener 30 is threaded on the end of the sleeve to hold the bearing in place.

A retainer 32 for the outer bearing race, guards 34 and 36 and a flinger 38 are also shown. Neither these members nor any part of the bearing structure forms any particular part of this invention but are shown and described since the splined connection employing the present indexing means is preferably disposed at this location.

The sleeve member end of the drive shaft section 12 is adapted to receive the stub shaft end 40 of a part of the universal joint 16. The sleeve member is internally splined as at 42 and the shaft 40 is externally splined as at 44, each to complement the other and as is best shown by Figure 3.

The end plate 46 secured across the inner end of sleeve 24 is to prevent dirt and other foreign matter from entering the splined joint from the shaft section 12. Packing 48 is also provided at the other end of the splined joint connection, and is held by the fastener means 30, for the same general purpose.

The proposed indexing means for assuring that the shaft section 14, including the universal joint 16 and its stub shaft end 40, is properly aligned with the shaft section 12, and consequently that each of the universal joints 16, 18 and 20 are aligned in the proper relative angular relationship, includes the use of a removable key within one of the splineways of one of the splined members. This is preferably a key in the form of a spring wire clip 50 having substantially parallel leg portions 52 and 54 with a connecting intermediate portion 56 bent in the direction in which the leg portions extend, as at 58. The spring wire clip or key 50 is best shown by Figure 4.

The spring clip 50 is preferably engaged upon the end of the externally splined male member, which is the stub shaft 40. The leg portion 54 is received within a recess or aperture 60 formed in the extreme end of the stub shaft 40, and the other leg portion 52 lies within one of the splineways, as 62, of the splined surface of the shaft.

The intermediate portion 56 of the clip, being bent as it is, provides a degree of spring flexure to the spacing of the leg portions so that the legs may frictionally engage the inner and outer surfaces, respectively, of the member upon which they are received. The clip, once in place, is secured to the shaft 40 by welding it to the end thereof at the bend 58.

The leg portion 52 of clip 50 is of such a thickness as prevents a spline of the sleeve member 24 from being received within the splineway 62 where it is disposed. A spline is therefore removed from the internally splined sleeve 24, in this instance, to provide a grooved space 64 for receiving the leg portion 52 of the keying clip and each next adjacent spline.

Although, as will be appreciated, this indexing means may be provided for at the time of assembly, as a practical matter the relative angular positions of the key receiving groove 64 and keying clip 50 are pre-established and provided for in the course of manufacture of the different parts of the assembly in which used.

As used with vehicle drive shafts the groove 64 is formed in the sleeve 24 immediately following the forming of the internal splines. The groove is angularly located relative to the universal joint 18 prior to being secured to the end 26 of the tubular drive shaft section 12. So also, the keying clip 50 is secured to the end of the shaft 40 of joint 16 following the forming of the external splines, by a welding fixture adapted to locate the clip relative to the receiving groove 64 within which it is to be received upon later assembly of the shaft sections.

I claim:

1. Indexing means for spline connected members and which includes a separately formed key receivable upon the end of one of said members and having a leg portion thereof receivable within one of the splineways thereof, and said other member having one of the splines thereof removed to provide an access for receiving said key upon engaging said spline connected members together.

2. Indexing means for spline connected members and which includes a wire clip separately formed and adapted to be secured to the end of one of said members, said clip including a portion for engaging the extreme end of said one member and a portion receivable within one of the splineways thereof, and said other member having one of the splines thereof removed to provide an access for receiving said last-mentioned clip portion upon engaging said spline connected members together.

3. Indexing means for spline connected members and which includes a spring wire clip separately formed and receivable upon the end of one of said members, said clip having substantially parallel spaced leg portions and having a connecting intermediate portion adapted to be secured to the end of said one member, a recess formed within the end of said one member for receiving one of said leg portions and the other thereof being receivable within one of the splineways of said one member, and the other of said spline connected members having one of the splines thereof removed to provide an enlarged groove for receiving therein said other leg portion and the splines next adjacent thereto upon the assembly of said members.

4. Indexing means for use with spline connected male and female members and comprising a wire clip receivable upon the end of said male member, said clip having substantially parallel spaced leg portions, a recess formed within the end of said male member for receiving one of said leg portions, the other of said leg portions of said clip being receivable within one of the splineways of said male member, and said female member having one of the splines thereof removed to provide an access for receiving said other leg portion upon the assembly of said members.

References Cited in the file of this patent

UNITED STATES PATENTS

| | | |
|---|---|---|
| 1,541,007 | Thiemer | June 9, 1925 |
| 2,381,770 | Overly | Aug. 7, 1945 |
| 2,615,315 | Werner | Oct. 28, 1952 |